United States Patent [19]

Iizuka et al.

[11] Patent Number: 5,719,721
[45] Date of Patent: Feb. 17, 1998

[54] METHOD AND APPARATUS FOR RECORDING TRACK NUMBERS IN A STANDARD RECORDING MODE AND A LONG TIME RECORDING MODE

[75] Inventors: Ken Iizuka, Kanagawa; Masaki Oguro, Tokyo, both of Japan

[73] Assignee: Sony Corporation, Tokyo, Japan

[21] Appl. No.: 587,534

[22] Filed: Jan. 17, 1996

[30] Foreign Application Priority Data

Jan. 23, 1995 [JP] Japan .................................. 7-027363

[51] Int. Cl.$^6$ ................................................ G11B 15/18
[52] U.S. Cl. ............................ 360/72.2; 360/48; 386/95
[58] Field of Search ............................ 360/72.2, 49, 48; 386/1, 46, 67, 95

[56] References Cited

U.S. PATENT DOCUMENTS 4,656,536  4/1987  Furumoto et al. ............... 360/72.2
5,541,737  7/1996  Oguro et al. ..................... 360/72.2 X

FOREIGN PATENT DOCUMENTS 0 551 944  7/1993  European Pat. Off. .
0 603 808  6/1994  European Pat. Off. .

*Primary Examiner*—Andrew L. Sniezek
*Attorney, Agent, or Firm*—William S. Frommer; Alvin Sinderbrand

[57] ABSTRACT

When a ratio of track pitches in an SP mode and an LP mode is equal to 3:2 the track number is recorded onto each track by advancing the track number one by one in the SP mode and the track number is advanced by setting the even or odd track numbers as a same track number in two tracks and is recorded onto each track in the LP mode. Thus, even when a new recording is performed onto a recorded tape, the track numbers are continuous, so that the track number can be used for detecting the absolute address.

6 Claims, 15 Drawing Sheets

Fig. 10

| SYNC BLOCK No. | | SUBCODE DATA | |
|---|---|---|---|
| MAIN AREA | OPTIONAL AREA | FORMER HALF OF VIDEO FRAME | LATTER HALF OF VIDEO FRAME |
| SB3 | SB0 | TTC | TTC |
| SB4 | SB1 | TTCorTBGorNOI | VRDorARDorNOI |
| SB5 | SB2 | TTC | VRDorARTorNOI |
| SB9 | SB6 | TTC | TTC |
| SB10 | SB7 | TTCorTBGorNOI | VRDorARDorNOI |
| SB11 | SB8 | TTC | VRDorARTorNOI |

TTC: TITLE TIME CODE PACK
TBG: TITLE BINARY GLOUP PACK
NOI: NO INFO PACK
VRD: VAUX RECORDING YEAR,MONTH,DAY,PACK
VRT: VAUX RECORDING TIME PACK
ARD: AAUX RECORDING YEAR,MONTH,DAY,PACK
ART: AAUX RECORDING TIME PACK

Fig. 11

| PC0 | HEADER |
|---|---|
| PC1 | |
| PC2 | |
| PC3 | |
| PC4 | |

| THE NUMBER OF TRACKS | 1 | 2 | 3 | 4 | 5 | | A |
|---|---|---|---|---|---|---|---|
| TRACK No. | 1 | 2 | 3 | 4 | 5 | | a |

| THE NUMBER OF TRACKS | 1 | 2 | 3 | 4 | 5 | 6 | | B |
|---|---|---|---|---|---|---|---|---|
| TRACK No. | $\frac{n}{m}$ | $\frac{2n}{m}$ | $\frac{3n}{m}$ | $\frac{4n}{m}$ | $\frac{5n}{m}$ | $\frac{6n}{m}$ | | b |

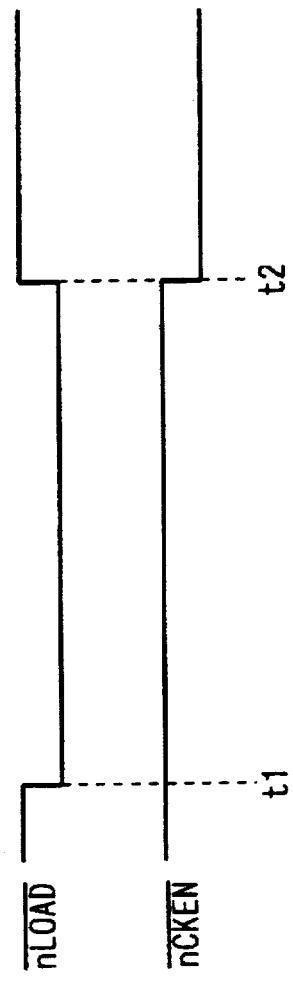
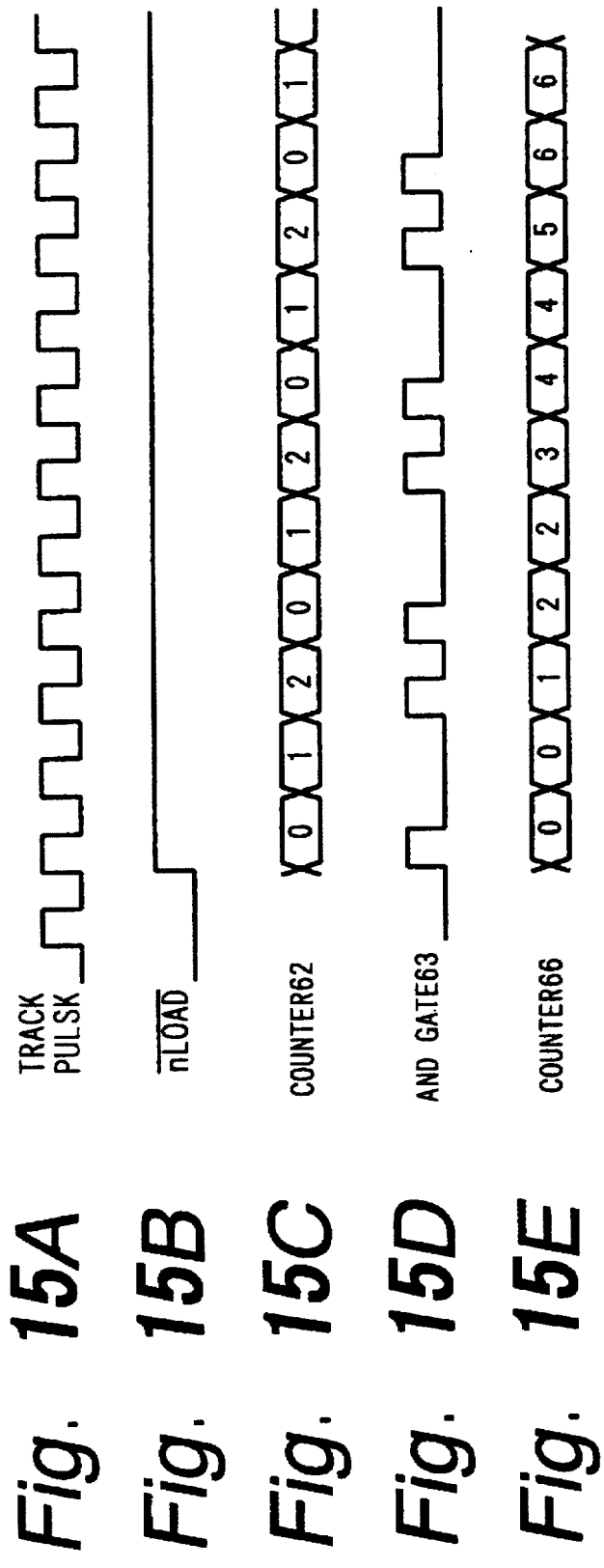
Fig. 14A
Fig. 14B
Fig. 15A
Fig. 15B
Fig. 15C
Fig. 15D
Fig. 15E

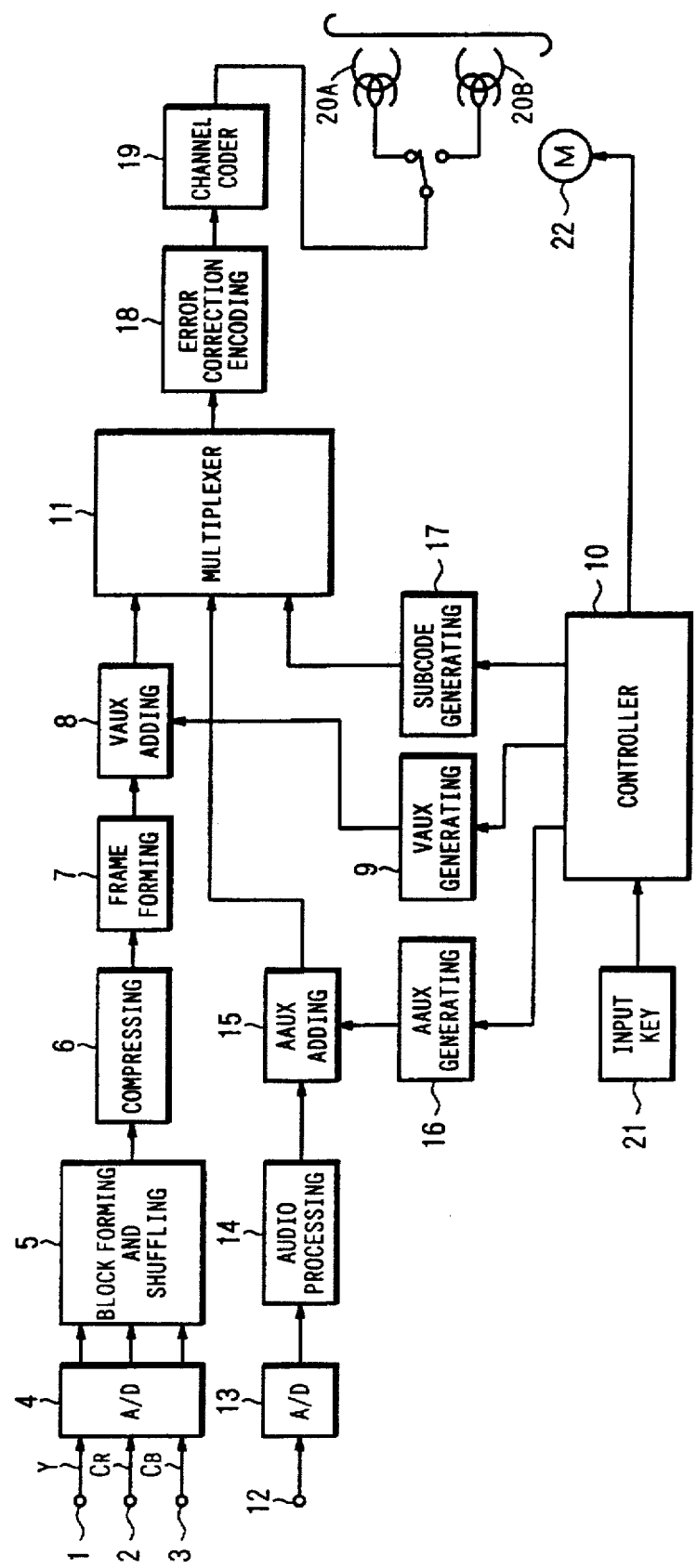

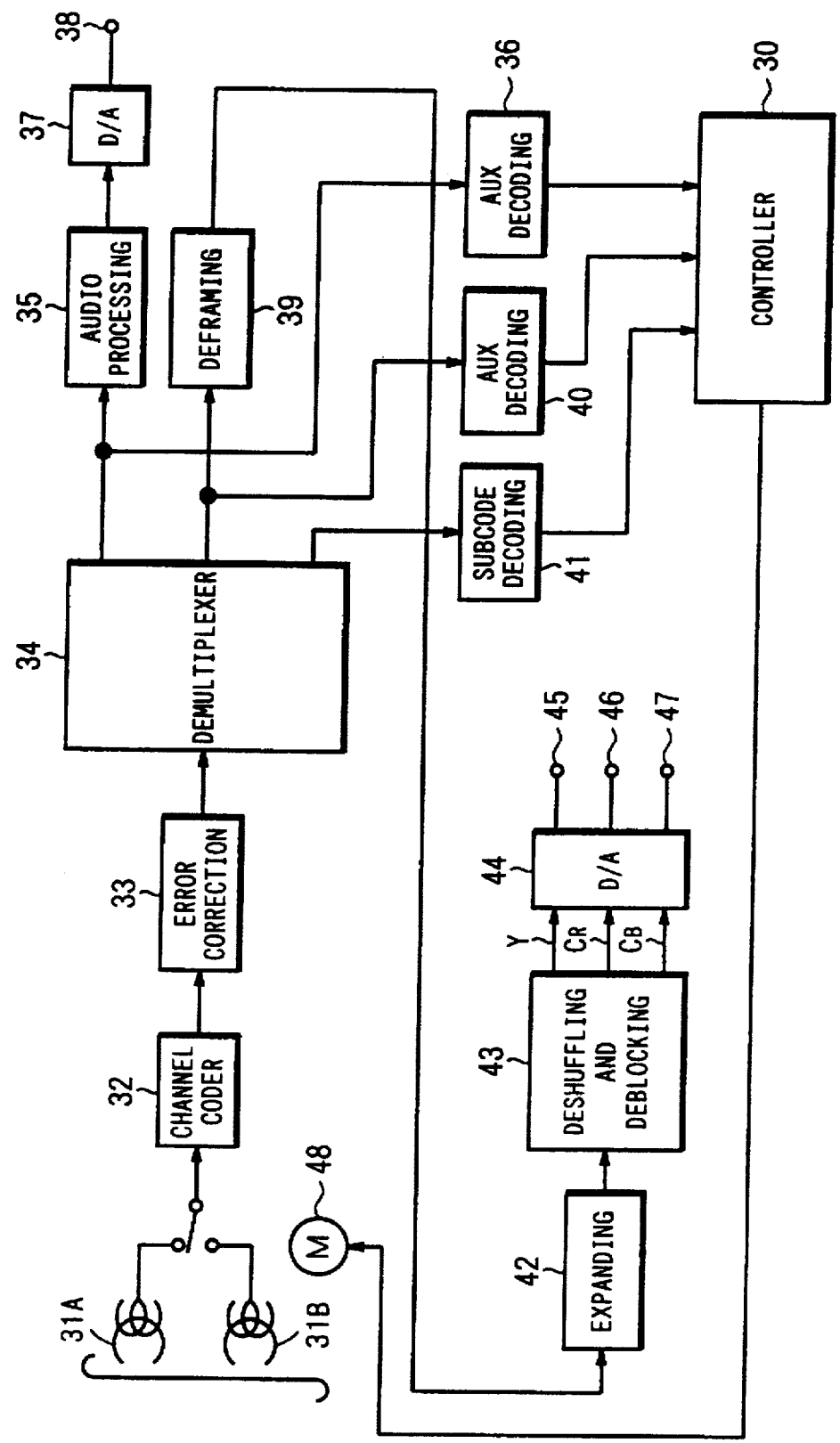

Fig. 20

FRAME FD1: 0(−) 1(+) 2(−) 3(+) 4(−) 5(+) 6(−) 7(+) 8(−) 9(+) 10(−) 11(+)

FRAME FD2: 12(−) 13(+) 14(−) 15(+) 16(−) 17(+) 18(−) 19(+) 20(−) 21(+) 22(−) 23(+)

FRAME FD3: 24(−) 25(+) 26(−) 27(+) 28(−) 29(+) 30(−) 31(+) 32(−) 33(+) 34(−) 35(+)

FRAME FD4: 36(−) 37(+) 38(−) 39(+) 40(−) 41(+) 42(−) 43(+) 44(−) 45(+) 46(−) 47(+)

FRAME FD5: 48(−) 49(+) 50(−) 51(+) 52(−) 53(+) 54(−) 55(+) 56(−) 57(+) 58(−) 59(+)

FRAME FD6: 60(−) 61(+) 62(−) 63(+) 64(−) 65(+) 66(−) 67(+) 68(−) 69(+) 70(−) 71(+)

METHOD AND APPARATUS FOR RECORDING TRACK NUMBERS IN A STANDARD RECORDING MODE AND A LONG TIME RECORDING MODE

BACKGROUND OF THE INVENTION

1. Field of the Invention

The present invention relates to a magnetic recording and reproducing apparatus and a data recording and reproducing method which are preferable for use in, particularly, a digital VTR of a compression recording system.

2. Description of the Related Art

A digital VTR of a compression recording system for compressing digital video signals by a DCT and a variable length encoding and for recording the signals onto a magnetic tape by rotary heads is being developed. In such a digital VTR of the compression recording system, it has been proposed that in addition to a standard recording mode (SP mode), a long time recording mode (LP mode) capable of performing a long time recording by narrowing a track pitch can be set.

When the recording at different track pitches is enabled as mentioned above, hitherto, there occurs a problem such that it is difficult to designate an absolute address from the track number when a new recording is performed at a different track pitch onto a tape which has already been recorded.

That is, in the digital VTR of the compression recording system, a subcode area is provided in each track. The subcode area is used for a high speed search and the track number is added to the subcode area.

For example, it is now assumed that the ratio of the track pitch in the SP mode and the track pitch in the LP mode is equal to 3:2 and the track number is added so as to be simply increased one by one. In this case, when signals have initially been recorded in the SP mode, track numbers which advance one by one . . . '6', '7', '8', . . . are added as shown in FIG. 1A. When a new recording is performed in the LP mode from, for example, the track number '11' onto the tape added with the track numbers as mentioned above, track numbers '11', '12', '13', . . . are added to newly recorded portions as shown in FIG. 1B. When the recording is performed as shown in FIG. 1B, the track numbers of the recorded portions and the track numbers of the portions newly recorded overlap. Consequently, the absolute address cannot be designated from the track number in the subcode area.

For instance, as shown in Japanese Patent Application No. 5-138646, it has been proposed that the track numbers are advanced by a multiple of the ratio of the track pitches in the respective modes and the track number is added to the subcode area. That is, for example, when the ratio of the track pitches in the SP mode and LP mode is equal to 3:2, the track numbers in the SP mode are set to integer numbers of 3 and the track numbers in the LP mode are set to integer numbers of 2.

In this case, when the signals are recorded in the SP mode at first, track numbers . . . , '18','21', '24', . . . are added as shown in FIG. 2A. When a new recording is performed in the LP mode from, for example, the track number '33', onto the tape added with the track numbers as mentioned above, track numbers '33', '35', '37', . . . are added to newly recorded portions as shown in FIG. 2B. When the track numbers are recorded in such a manner as shown in FIG. 2B, the track numbers of the recorded portions and the track numbers in the newly recorded portions are continuous, so that the absolute address can be designated from the track number.

When the track numbers are added as mentioned above, however, there occurs a problem such that the number of bits which have to be assured for expressing the track numbers increases. That is, when the track numbers are set to integer numbers of 3 as mentioned above, the number of bits for expressing only the number that is three times as many as the track numbers has to be assured in order to express the track numbers in the SP mode. Consequently, the number that is three times as many as the number in a case where the track numbers are simply added one by one is necessary to express the track numbers, so that the number of necessary bits increases in correspondence to such an increased number. When the relation of the ratio of the track pitches becomes further complicated, the number of necessary bits further increases.

OBJECTS AND SUMMARY OF THE INVENTION

It is, therefore, an object of the invention to provide a magnetic recording and reproducing apparatus and a data recording and reproducing method, in which even when a recording is performed at different track pitches, an absolute address can be designated from a track number and the number of bits which have to be assured for expressing the track numbers doesn't increase.

The invention relates to a data recording and reproducing method of a magnetic recording and reproducing apparatus, wherein a standard recording mode and a long time recording mode in which a long time recording can be executed by narrowing a track pitch than that in the standard recording mode can be set, a track number is recorded onto each track by advancing the track number one by one in the standard recording mode, the track number is recorded onto each track by advancing the track number by setting even or odd track numbers as a same track number in two tracks in the long time recording mode, and an absolute address on a tape is detected on the basis of each of the track numbers reproduced.

According to the invention, a signal of one frame is recorded in a plurality of tracks, azimuth angles of the head tracks of the frames are set to be equal, and the absolute address is detected on the basis of the track number reproduced and the azimuth angle of the reproduced track.

The invention relates to a magnetic recording and reproducing apparatus comprising: means for setting a standard recording mode and a long time recording mode in which a long time recording can be executed by setting a track pitch to be narrower than that in the standard recording mode; means for generating a track number according to whether the recording mode is the standard recording mode or the long time recording mode; and means for recording the track number onto each track, wherein the track number is advanced one by one and the track number is recorded onto each of the tracks in the standard recording mode, and the track number is advanced by setting even or odd track numbers as a same track number in two tracks and the track number is recorded onto each of the tracks in the long time recording mode.

The track number is recorded onto each track by increasing the track number one by one in the SP mode and, the track number is advanced by setting the even or odd track numbers as a same track number in two tracks and is recorded onto each track in the LP mode. In this manner, even when a new recording is performed onto a recorded tape, the track numbers are continuous, so that the track number can be used for detecting the absolute address. Since the track number is increased one by one in the SP mode, the number of bits which have to be assured in order to record the track numbers does not increase. By detecting which azimuth angle the track has, the invention can be also cope with the case where the same track numbers exits in the two frames when the recording is performed in the LP mode.

The above, and other, objects, features and advantage of the present invention will become readily apparent from the following detailed description thereof which is to be read in connection with the accompanying drawings.

BRIEF DESCRIPTION OF THE DRAWINGS

FIG. 10 is a schematic diagram which is used for explaining a recording format of subcode data in the digital VTR to which the invention can be applied;

FIG. 11 is a schematic diagram which is used for explaining a recording format of subcode data in the digital VTR to which the invention can be applied;

FIGS. 14A and 14B are timing charts which is used for explaining the track number generating circuit;

FIGS. 15A to 15E are timing charts which is used for explaining the track number generating circuit;

FIG. 16 is a block diagram showing a construction of a recording system of the digital VTR to which the invention can be applied;

FIG. 17 is a block diagram showing a construction of a reproducing system of the digital VTR to which the invention can be applied;

FIG. 20 is a schematic diagram which is used for explaining a case of recording track numbers in the PAL system.

DETAILED DESCRIPTION OF THE PREFERRED EMBODIMENTS

Figure 1A:
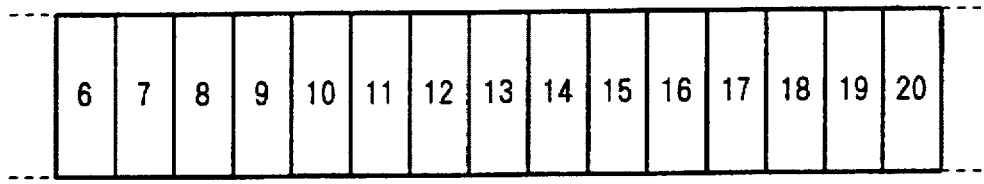
FIGS. 1A and 1B are schematic diagrams which is used for explaining a conventional recording of track numbers.
Figure 1B:
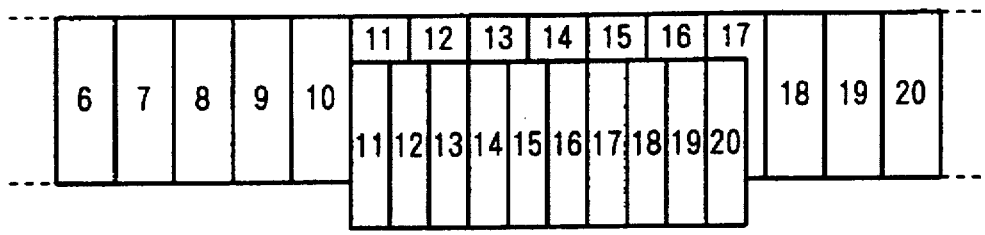
Figure 2A:
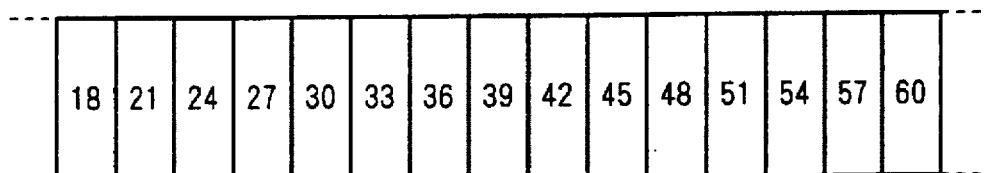
FIGS. 2A and 2B are schematic diagrams which is used for explaining the conventional recording of track numbers.
Figure 2B:
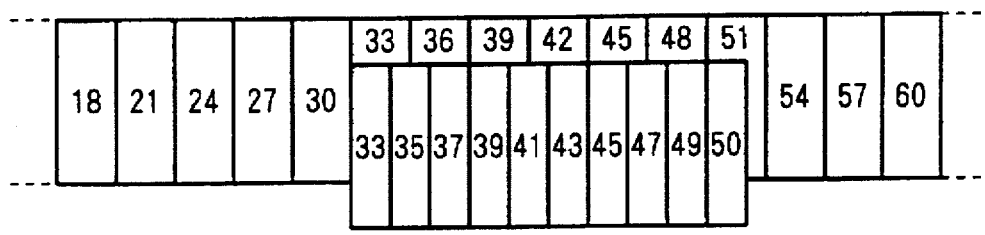
Figure 3:
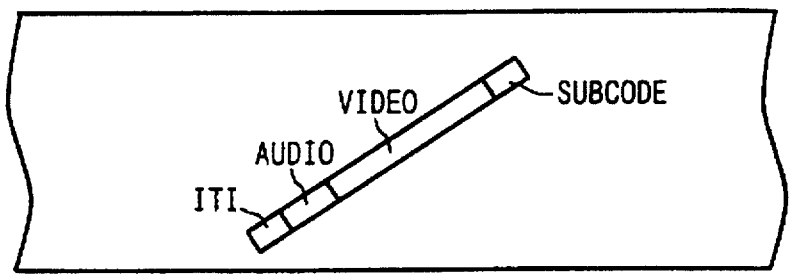
FIG. 3 is a schematic diagram which is used for explaining a track format of a digital VTR to which the invention can be applied.

The invention is applied to a digital VTR of a compression recording system for compressing and recording digital video signals. FIG. 3 shows a recording track of such a digital VTR. In the track of such a digital VTR, as shown in FIG. 3, an ITI area is provided at the head of each track and an audio area, a video area, and a subcode area are subsequently provided. The ITI area is a timing block for certainly executing an after-recording and is used for accurately positioning when data written in areas after the ITI area is after-recorded and rewritten. Audio data is recorded in the audio area. Compressed video data is recorded in the video area. The subcode area is used for high speed searching. When data of the NTSC system is recorded, one video frame is recorded in 10 tracks and in case of the PAL system, one video frame is recorded in 12 tracks.

In the digital VTR to which the invention is applied, a standard recording mode (SP mode) and a long time recording mode (LP mode) can be set. In the LP mode, a feeding speed of a tape is slower than that in the SP mode and the track pitch is narrower than that in the SP mode. In the SP mode, the track pitch is equal to 10 µm. In the LP mode, the track pitch is equal to 6.7 µm. Therefore, the ratio of the track pitches in the SP mode and the LP mode is equal to 3:2.

Figure 4:
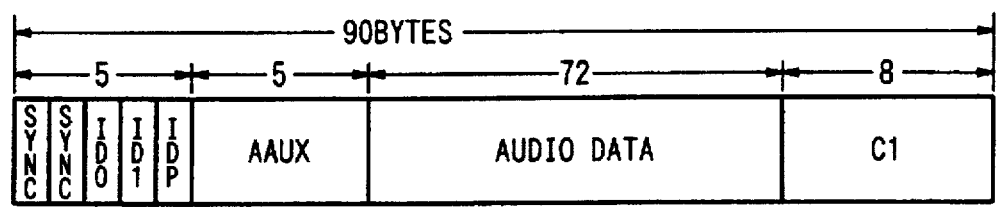
FIG. 4 is a schematic diagram which is used for explaining a recording format of audio data in the digital VTR to which the invention can be applied.
Figure 5:
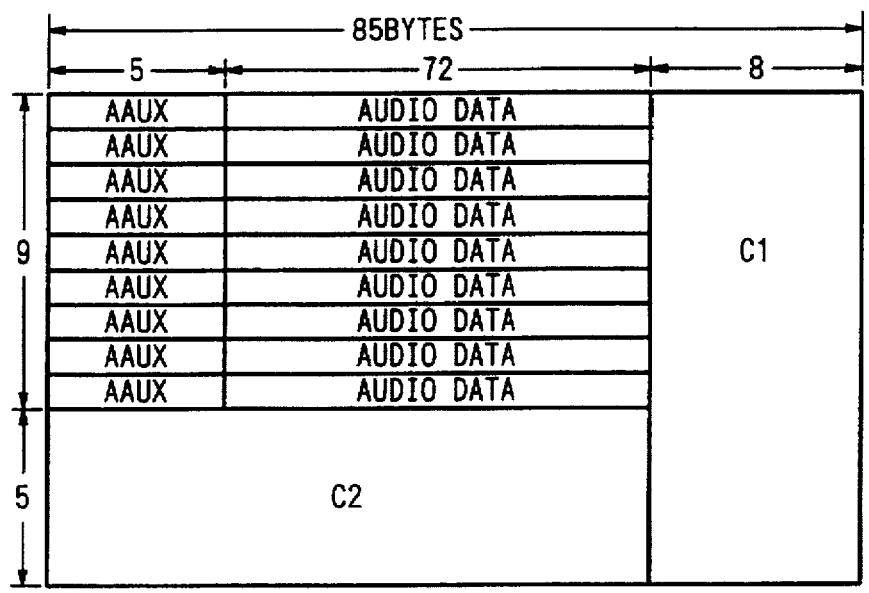
FIG. 5 is a schematic diagram which is used for explaining a recording format of audio data in the digital VTR to which the invention can be applied.

FIGS. 4 and 5 show a structure of data in the audio area. As shown in FIG. 4 one sync block consists of 90 bytes. Five bytes of the former half of a data portion are constructed by syncs and ID data and a data portion consists of 77 bytes (72 bytes of audio data and 5 bytes of AAUX). The data portion is protected by a horizontal parity C1 and a vertical parity C2. Five bytes of the former half of the data portion are used for AAUX.

Figure 6:
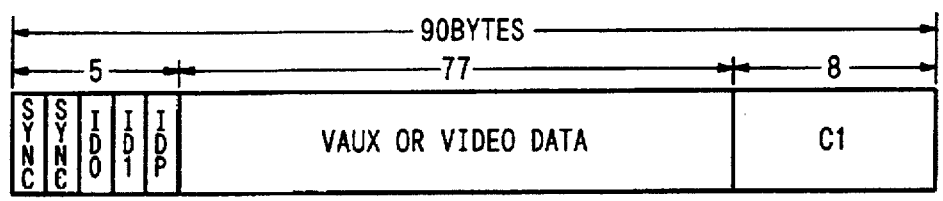
FIG. 6 is a schematic diagram which is used for explaining a recording format of video data in the digital VTR to which the invention can be applied.
Figure 7:
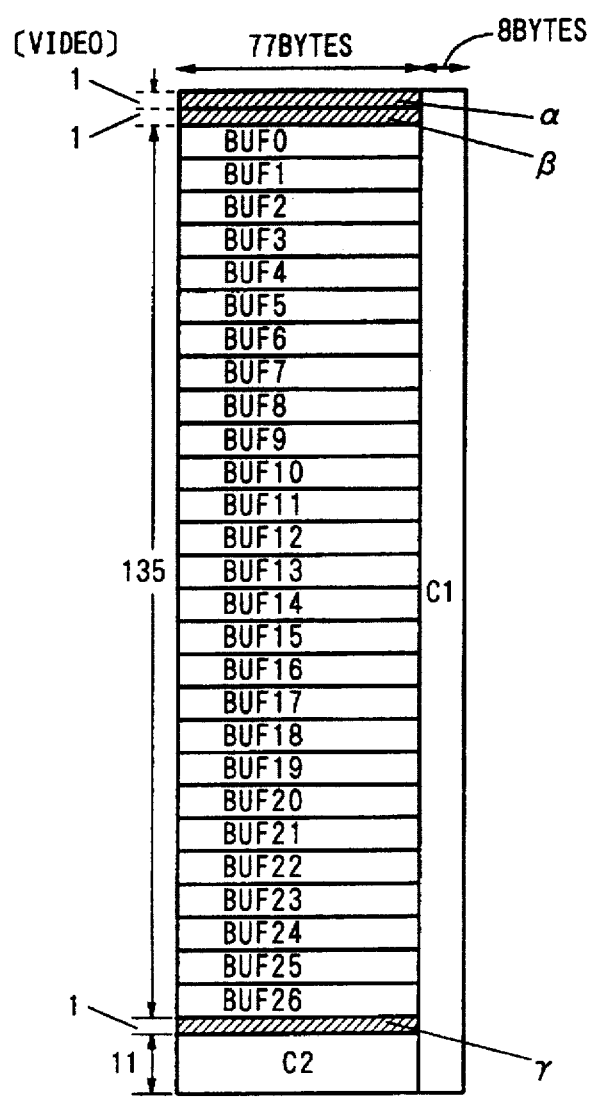
FIG. 7 is a schematic diagram which is used for explaining a recording format of video data in the digital VTR to which the invention can be applied.

FIGS. 6 and 7 show a structure of data in the video area. One sync block in the video area consists of 90 bytes. Five bytes of the former half of a data portion are constructed by syncs and ID data and the data portion consists of 77 bytes. The data portion is protected by the horizontal parity C1 and the vertical parity C2 as shown in FIGS. 6 and 7.

FIG. 7 shows 149 sync blocks which are vertically arranged in a video sector. As shown in FIG. 7, upper two sync blocks and a sync block just before the C2 parity are assured for VAUX. Video data is stored in the sync blocks other than the sync blocks for the VAUX and the C2 parity. In FIG. 7, 135 sync blocks in the center portion are a storage area of video signals. In the diagram, BUF0 to BUF26 denote buffering units. One buffering unit is constructed by five sync blocks and 27 buffering units are included in one track. 270 buffering units exist in one video frame, namely, 10 tracks. That is, areas which are effective as images are extracted from the image data of one frame and are sampled and collected, thereby forming 270 groups. One of the groups is one buffering unit.

Figure 8A:
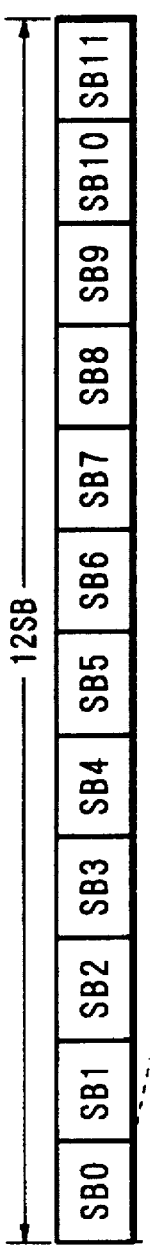
FIGS. 8A to 8D are schematic diagrams which is used for explaining a recording format of subcode data in the digital VTR to which the invention can be applied.
Figure 8B:
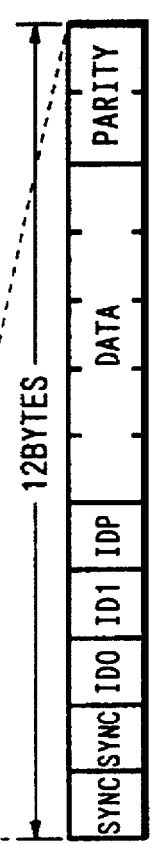

FIGS. 8A to 8D show a construction of the subcode area. As shown in FIG. 8A, the subcode area consists of 12 sync blocks. One sync block consists of 12 bytes as shown in FIG. 8B.

Sync patterns of two bytes are provided at the head of one sync block as shown in FIG. 8B. Subsequently, three bytes comprising ID data consisting of ID0 and ID1 and IDP as a parity for ID0 and ID1 are added. A main data area of five bytes is subsequently provided and, further, a parity of two bytes is added. One sync block in the subcode area consists of 12 bytes and is shorter than that in the video area or audio area. This is because the high speed search is enabled.

Figure 8C:
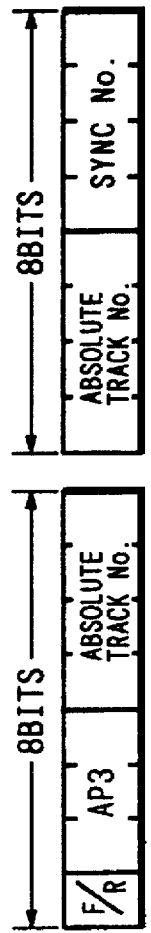
Figure 8D:
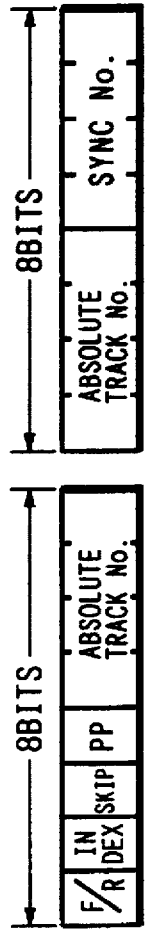

As shown in FIGS. 8C and 8D, an F/R flag for detecting the address at the time of the high speed search is provided for ID0. Subsequent to it, as shown in FIG. 8C, an application ID (AP3) indicative of the data structure of the subcode is arranged in sync block numbers SB0 and SB6 and the absolute track number is arranged so as to also exist in the following ID1. In the other sync block numbers, as shown in FIG. 8D, the F/R flag is provided and, subsequently, an index ID (INDEX), a skip ID (SKIP), and a photo picture ID (PP) are provided and the absolute track number is arranged so as to also exist in ID1. The index ID is used for index searching. The skip ID is used for cutting unnecessary scenes. The photo picture ID is used for still picture searching. The absolute track number is recorded in ID1 so as to exist in ID1 as well and the sync number is also recorded in ID1.

Figure 9:
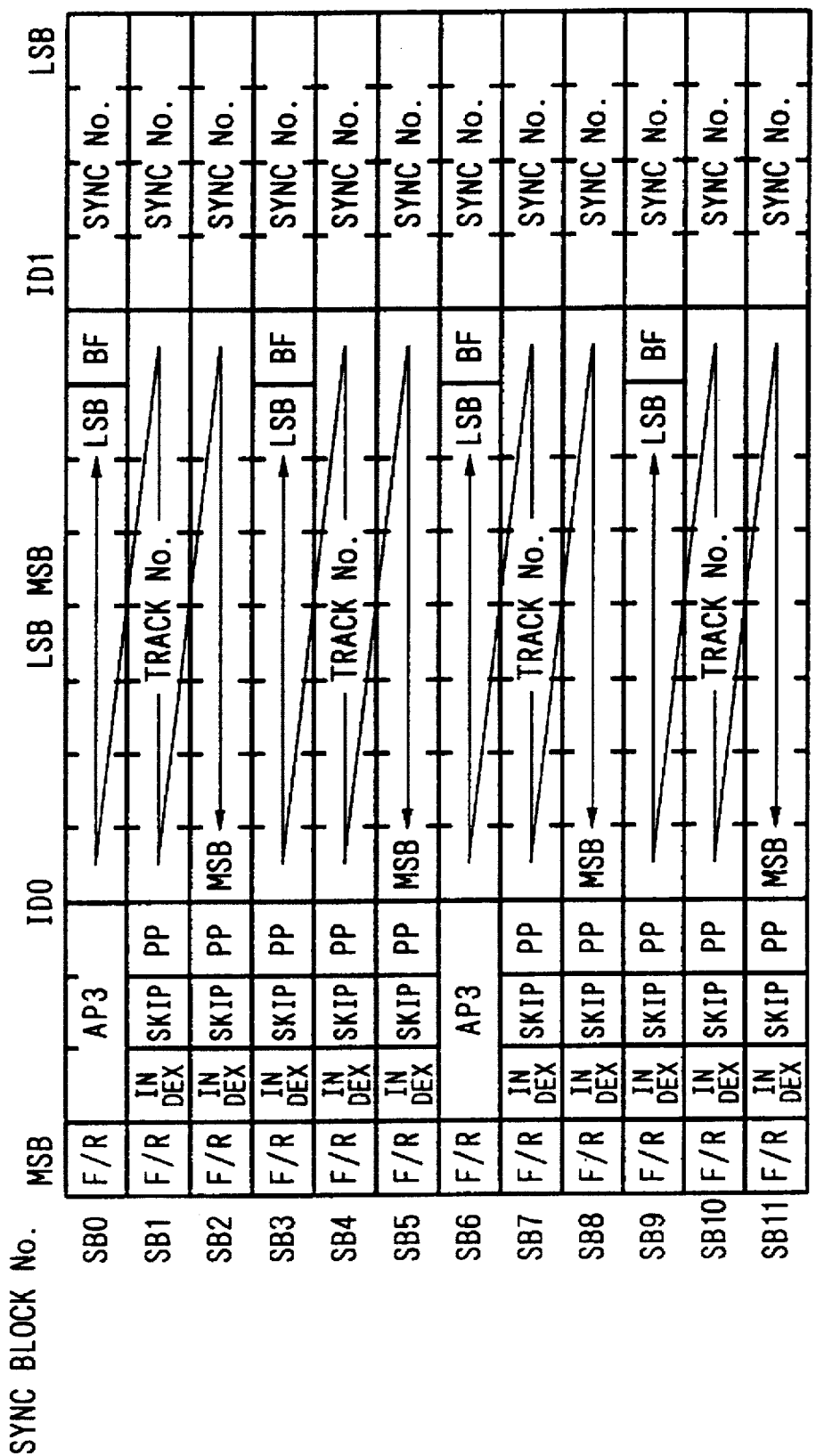
FIG. 9 is a schematic diagram which is used for explaining a recording format of subcode data in the digital VTR to which the invention can be applied.

FIG. 9 shows a construction in which the ID portions (ID0 and ID1) of the 12 sync blocks (SB0 to SB11) of one track are arranged. The same absolute track number is overlappingly written four times by using 23 bits of the ID portions of the sync block numbers SB0 to SB2, SB3 to SB5, SB6 to SB8, and SB9 to SB11. BF denotes a blank flag. The blank flag BF is used for discriminating a case where a blank occurs on a tape and the track numbers are not continuous.

FIG. 10 shows data to be recorded in the main area of the subcode. The data in the main area is recorded in a pack structure based on five bytes as shown in FIG. 11. One byte PC0 at the head is a header. Data is arranged in subsequent four bytes of PC1 to PC4. As shown in FIG. 8B, since the main data area of one sync block consists of five bytes, data of just one pack is recorded in one sync block. The foregoing auxiliary data VAUX in the video area and the auxiliary data AAUX of the audio data are also written in a similar pack structure.

As shown in FIG. 10, the sync block numbers SB3 to SB5 and SB9 to SB11 are set to main areas and the sync block numbers SB0 to SB2 and SB6 to SB8 are set to optional areas. A construction of the former half (five tracks of the former half in the NTSC system; six tracks of the former half in the PAL system) of one frame of the data in the main area in the subcode area and a construction of the latter half (five tracks in the latter half in the NTSC system; latter six tracks in the PAL system) are different. A title time code pack (TTC pack) and a title binary group pack (TBG pack) are recorded in the former half of one frame. The title time code pack (TTC pack), a recording year/month/day pack of video (VRD pack), and a recording hour/minute/second pack of video (VDT pack) or a recording year/month day pack of audio (ARD pack) and a recording hour/minute/second pack of audio (ART pack) are recorded in the latter half of one frame. When the optional area is not used, it is recommended to record data of contents similar to the data of the main area in the optional area.

As mentioned above, the track number is written in the subcode area in such a digital VTR. The track number is used to designate the absolute address on the tape. The number of bits assured as a track number is equal to 23 bits as shown in FIG. 9

In the digital VTR to which the invention is applied, the SP mode and the LP mode can be set as mentioned above. The SP and LP modes have different track pitches. The track numbers are added as follows in an embodiment of the invention in a manner such that the absolute address can be certainly designated and the number of bits necessary to assure the track number doesn't increase even when the recordings of different track pitches are performed.

It is now assumed that the track pitch in the SP mode is set to (m) and the track pitch in the LP mode is set to (n). The track number is advanced one by one in the SP mode and the track number is advanced by only the number corresponding to (n/m) in the LP mode. A process for advancing the track number by only the number corresponding to (n/m) denotes that the track number is advanced by (n) tracks among (m) tracks.

Figure 12A:
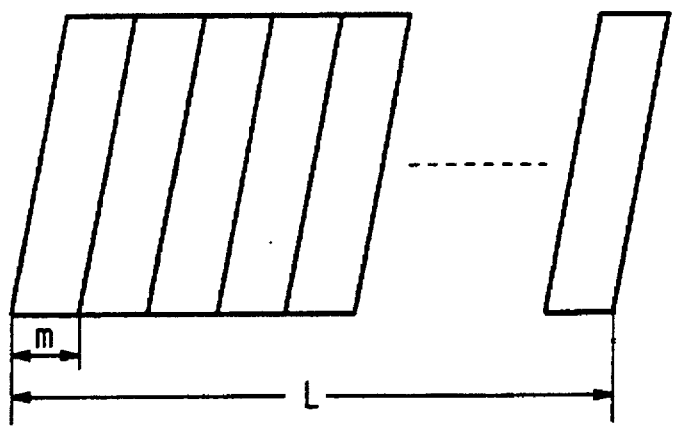
FIGS. 12A and 12B are schematic diagrams which is used for explaining the recording of track numbers.

That is, as shown in FIG. 12A, since the track pitch in the SP mode is equal to (m) and the track number is advanced one by one, the number (A) of tracks at a position where the number was moved to a distance (L) is obtained by $$A = L/m$$

and a track number (a) at the position of the distance (L) is obtained by $$a = A = L/m$$

Figure 12B:
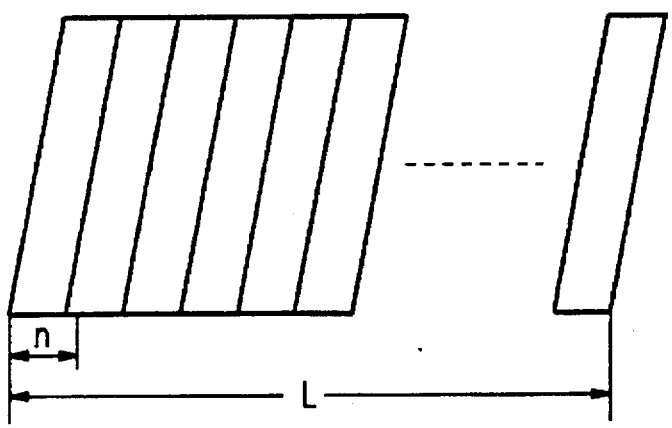

On the other hand, as shown in FIG. 12B, the track pitch is equal to (n) in the LP mode. The number (B) of tracks at a position where the number was moved to the distance (L) is obtained by $$B = L/n$$

The track number is advanced by (n/m) of the number (B) of tracks. Thus, a track number (b) at the position of the distance (L) is obtained by $$b = B \times (n/m) = (L/n) \times (n/m) = L/m$$

When the track number is advanced one by one at the track pitch as a reference and the track number is advanced by (n/m) at the other track pitch as mentioned above, the track numbers (a) and (b) at the positions where they were moved to the distance (L) coincide in case of recording at both of the track pitches. By allocating the track numbers as mentioned above, the track number can be set to the absolute index. Since the track numbers are integers, the track number cannot be advanced by (n/m) at a time. A process for advancing the track number by (n/m) at a time denotes that the track number is advanced by (n) tracks among the (m) tracks.

Specifically speaking, the track pitch in the SP mode is equal to 10 μm and the track pitch in the LP mode is equal to 6.7 μm. The ratio of the track pitches in the SP mode and LP mode is equal to 3:2. In the SP mode, the track numbers are sequentially advanced one by one and are set to "0", "1", "2", "3", "4", . . . . In the LP mode, the odd track number is advanced one track by one and the even track number is advanced by adding the same track number for two tracks like "0", "0", "1", "2", "2", "3", "4", "4", . . . . When the track number is advanced as mentioned above, two tracks among three tracks are advanced and the track number is consequently advanced by ⅔ at a time.

Since it is sufficient to advance the track number by two tracks among three tracks, the odd track numbers can be also set to the same number for two tracks like "0", "1", "1", "2", "3", "3", "4", "5", "5", . . . .

Figure 13:
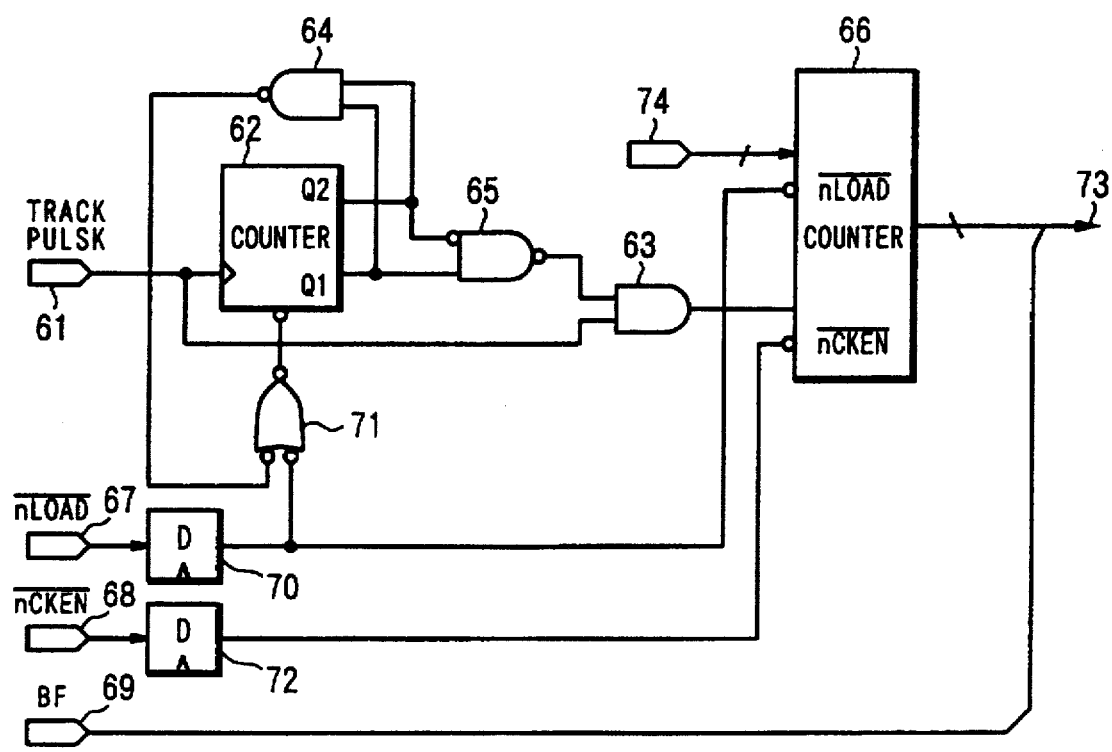
FIG. 13 is a block diagram of an example of a track number generating circuit.

FIG. 13 shows an example of a specific circuit for generating the track numbers as mentioned above in the SP mode. In FIG. 13, track pulses are supplied to an input terminal 61. The track pulses are supplied to a clock input terminal of a 2-bit counter 62 and also are supplied to one input terminal of an AND gate 63. Outputs Q1 and Q2 of the 2-bit counter 62 are supplied to an NAND gate 64. The output Q1 of the 2-bit counter 62 is supplied to one input terminal of an NAND gate 65 and the output Q2 of the 2-bit counter 62 is inverted and is supplied to the other input terminal of the NAND gate 65. An output of the NAND gate 65 is supplied to the other input terminal of the AND gate 63. An output of the AND gate 63 is supplied to a clock input terminal of a counter 66.

A load signal is supplied to an input terminal 67. The load signal is supplied to a flip-flop 70. An output of the flip-flop 70 is supplied to one input terminal of an NOR gate 71 and is also supplied to a load terminal of the counter 66. An output of the NAND gate 64 is supplied to the other input terminal of the NOR gate 71.

A clock enable signal is supplied to an input terminal 68. The clock enable signal is supplied to a flip-flop 72. An output of the flip-flop 72 is supplied to a clock enable terminal of the counter 66.

A preset value is loaded from a terminal 74 to the counter 66. An output of the counter 66 is generated as a track number from an output terminal 73. A BF flag from an input terminal 69 is added to the output of the counter 66.

As shown in FIG. 14A, first, at a time point t1, the load signal from the input terminal 67 is set to (L), the 2-bit counter 62 is cleared, and the preset value is given to the counter 66. When the writing of the track number is started at a time point t2 as shown in FIG. 14B, the clock enable signal is set to (L) so that the counter 66 can perform the counting operation.

The 2-bit counter 62 counts track pulses, the NAND gate 65 detects that the value of the 2-bit counter 62 is equal to "1 (Q1 =1, Q2 =0)", and the NAND gate. 64 detects that the value of the 2-bit counter 62 is set to "2 (Q1 =1, Q2 =01)". When the value of the 2-bit counter 62 is a value other than "1" (namely, "0"or "2"), since the output of the NAND gate 65 is set to (H), the AND gate 63 is opened and the track pulses from the input terminal 61 are supplied to the counter 66. When the value of the 2-bit counter 62 is equal to "1", the AND gate 63 is closed and the track pulses from the input terminal 61 are not supplied to the counter 66. When the value of the 2-bit counter 62 is equal to "2", the output of the NAND gate 64 is set to (L) and the 2-bit counter 62 is cleared.

The track pulses are given as shown in FIG. 15A and the load signal is given at a timing shown in FIG. 15B. The 2-bit counter 62 counts the track pulses from "0" to "2" as shown in FIG. 15C and stops the supply of track pulses to the counter 66 when the output of the 2-bit counter 63 is equal to "1". Therefore, the track pulses which are given to the counter 66 through the AND gate 63 are as shown in FIG. 15D. By counting the track pulses, the track numbers such that the even numbers are advanced so as to be overlapped twice are formed as shown in FIG. 15E.

FIG. 16 shows a construction of a recording system of a digital VTR to which the invention can be applied. The digital VTR compresses a digital video signal and records the signal onto a magnetic tape by rotary heads. In the digital VTR, the standard recording mode and the long time recording mode can be set. The mode can be set by an input key 21. A capstan motor 22 is operated so as to obtain a tape speed according to the recording mode. The track pitch is equal to 10 μm. in the SP mode and is equal to 6.7μm in the LP mode.

In FIG. 16, component color video signals Y, $C_R$, and $C_B$ are supplied to input terminals 1, 2, and 3. The component color video signals Y, $C_R$, and $C_B$ are supplied to an A/D converter 4. The A/D converter 4 digitizes the component signals Y, $C_R$, and $C_B$ by a sampling clock of a frequency of 13.5 MHz.

An output of the A/D converter 4 is supplied to a block forming and shuffling circuit 5. The output is divided into (8×8) blocks by the block forming and shuffling circuit 5. Compressions are averaged on a whole picture plane and a shuffling is performed so as to prevent that data is concentratively dropped out by a clog of the head, a damage of the tape, or the like.

An output of the block forming and shuffling circuit 5 is supplied to a compressing circuit 6. The compressing circuit 6 compresses video data by a DCT transformation and a variable length encoding. That is, the compressing circuit 6 has a DCT transforming circuit, a quantizer for quantizing DCT transformed data, an estimator for estimating a total amount of codes and deciding an optimum quantizer, and a variable length encoding circuit for compressing data by using a two-dimensional Huffman code. (8×8) data in a time region is converted to (8×8) coefficient data in a frequency region and the coefficient data is quantized and variable-length encoded.

An output of the compressing circuit 6 is supplied to a frame forming circuit 7. Video data is packed in predetermined sync blocks by the frame forming circuit 7 in accordance with a predetermined rule. An output of the frame forming circuit 7 is supplied to a VAUX adding circuit 8.

VAUX data is supplied from a VAUX generating circuit 9 to the VAUX adding circuit 8. The VAUX data is given from a controller 10 to the VAUX generating circuit 9. The video data to which the VAUX data was added by the VAUX adding circuit 8 is supplied to a multiplexer 11.

An audio signal is supplied to an input terminal 12. The audio signal is supplied to an A/D converter 13. The audio signal is digitized by the A/D converter 13. The digitized audio signal is supplied to an audio signal processing circuit 14. Audio data is packed into predetermined sync blocks by the audio processing circuit 14. An output of the audio signal processing circuit 14 is supplied to an AAUX adding circuit 15.

AAUX data is supplied from an AAUX generating circuit 16 to an AAUX adding circuit 15 on the basis of a control from the controller 10. The AAUX data is added to the audio data by the AAUX adding circuit 15. The audio data to which the AAUX data was added is supplied to the multiplexer circuit 11.

A subcode is generated by a subcode generating circuit 17. A subcode area is used for a high speed search and the track numbers are included in subcode data. The track number is sequentially advanced one by one at the track pitch in a mode (SP mode) as a reference and the track number is advanced in correspondence to the ratio of both of the track pitches at the track pitch in the other mode (LP mode). As mentioned above, specifically speaking, the track pitch in the SP mode is equal to 10 μm, the track pitch in the LP mode is equal to 6.7 μm, and the ratio of the track pitches in the SP mode and the LP mode is equal to 3:2. Therefore, the track number is sequentially advanced one by one like "0", "1", "2", "3", "4", . . . in the SP mode and the track number is advanced so that even track numbers overlap in two tracks like "0", "0", "1", "2", "2", "3", "4", "4", . . . .

The video data, audio data, and subcode data are switched by the multiplexer circuit 11. An output of the multiplexer circuit 11 is supplied to an error correction encoding circuit 18. An error correction code is added to the recording data by the error correction encoding circuit 18. An output of the error correction encoding circuit 18 is supplied to a channel coder 19. The recording data is 24/25 converted by the channel coder 19. A coding process of a partial response class 4 adaptive to the digital recording is further executed here. An output of the channel coder 19 is supplied to heads 20A and 20B.

FIG. 17 shows an example of a construction of a reproducing system of a digital VTR. In the digital VTR, a standard recording mode and a long time recording mode can be set. A capstan motor 48 is driven so as to set a tape speed according to the recording mode.

In FIG. 17, reproduction signals of heads 31A and 31B are supplied to a channel decoder 32. The reproduction signal is demodulated by the channel decoder 32. An output of the channel decoder 32 is supplied to an error correction circuit 33. An error correcting process is performed by the error correction circuit 33. An output of the error correction circuit 33 is supplied to a demultiplexer 34.

Data is divided into reproduction data in the audio area, reproduction data in the video area, and reproduction data in the subcode area by the demultiplexer 34.

The reproduction data in the audio area is supplied to an audio processing circuit 35. The AAUX data in the reproduction data in the audio area is detected by an AAUX decoding circuit 36. The AAUX data is supplied to a controller 30. Processes such as time base conversion, interpolation, and the like are executed by the audio processing circuit 35. An output of the audio processing circuit 35 is supplied to a D/A converter 37. An output of the D/A converter 37 is outputted from an output terminal 38.

The reproduction data in the video area is supplied to a deframing circuit 39. The VAUX data in the reproduction data in the video area is detected by a VAUX decoding circuit 40. The VAUX data is supplied to the controller 30.

The reproduction data in the subcode area is detected by a subcode decoding circuit 41. The subcode data is supplied to the controller 30.

An output of the deframing circuit 39 is supplied to an expanding circuit 42. The expanding circuit 42 converts the compressed and recorded video signal into the original video signal in the time area by decoding the variable length code and an inverse DCT transformation. An output of the expanding circuit 42 is supplied to a deshuffling and deblocking circuit 43. The reproduction component color video signals Y, $C_R$, and $C_B$, are obtained from the deshuffling and deblocking circuit 43. The reproduction component color video signals Y, $C_R$, and $C_B$, are supplied to a D/A converter 44. Outputs of the D/A converter 44 are outputted from output terminals 45, 46, and 47.

According to the embodiment of the invention as mentioned above, when the track pitch in the SP mode is equal to 10 μm and the track pitch in the LP mode is equal to 6.7 μm, the track number is sequentially advanced one by one in the SP mode like "0", "1", "2", "3", "4", . . . and the track number is advanced so as to overlap the even track numbers in two tracks in the LP mode like "0", "0", "1", "2", "2", "3", "4", "4", . . . . . A description will be further made with respect to a fact that when the track numbers are advanced and recorded, the track number can be used as an index of an absolute address.

Figure 18:
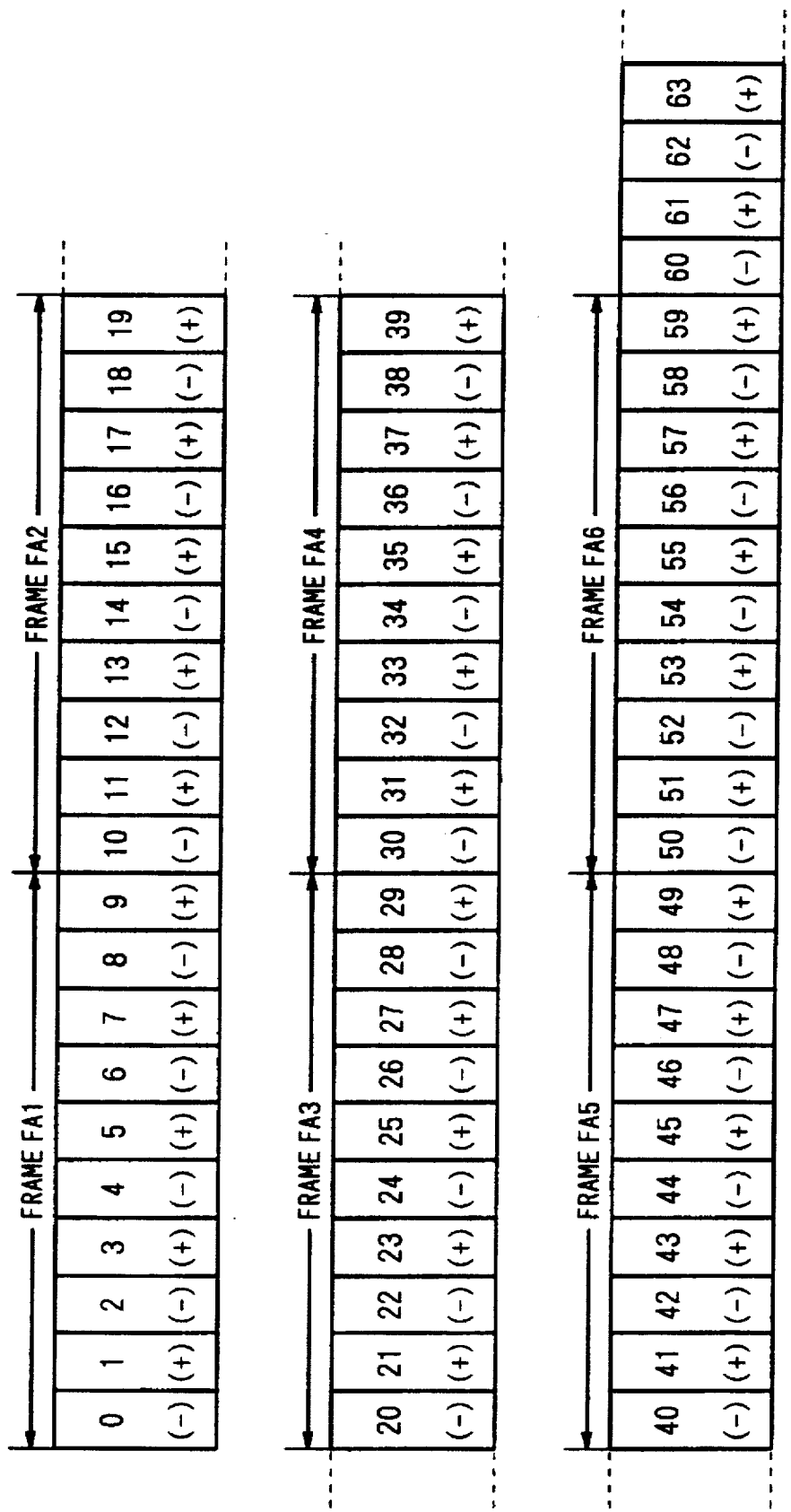
FIG. 18 is a schematic diagram which is used for explaining a case of recording track numbers in the NTSC system.

FIG. 18 shows the track numbers added on a tape by recording the signals of the NTSC system in the SP mode. In case of recording in the SP mode, the tracks are formed at a track pitch of 10 μm as shown in FIG. 18. The track number is sequentially advanced one track by one like "0", "1", "2", "3", . . . . Since 10 tracks are recorded in one frame in the NTSC system, track numbers "0", "10", "20", "30", . . . are the head tracks of frames FA1, FA2, FA3, . . . , respectively.

Figure 19:
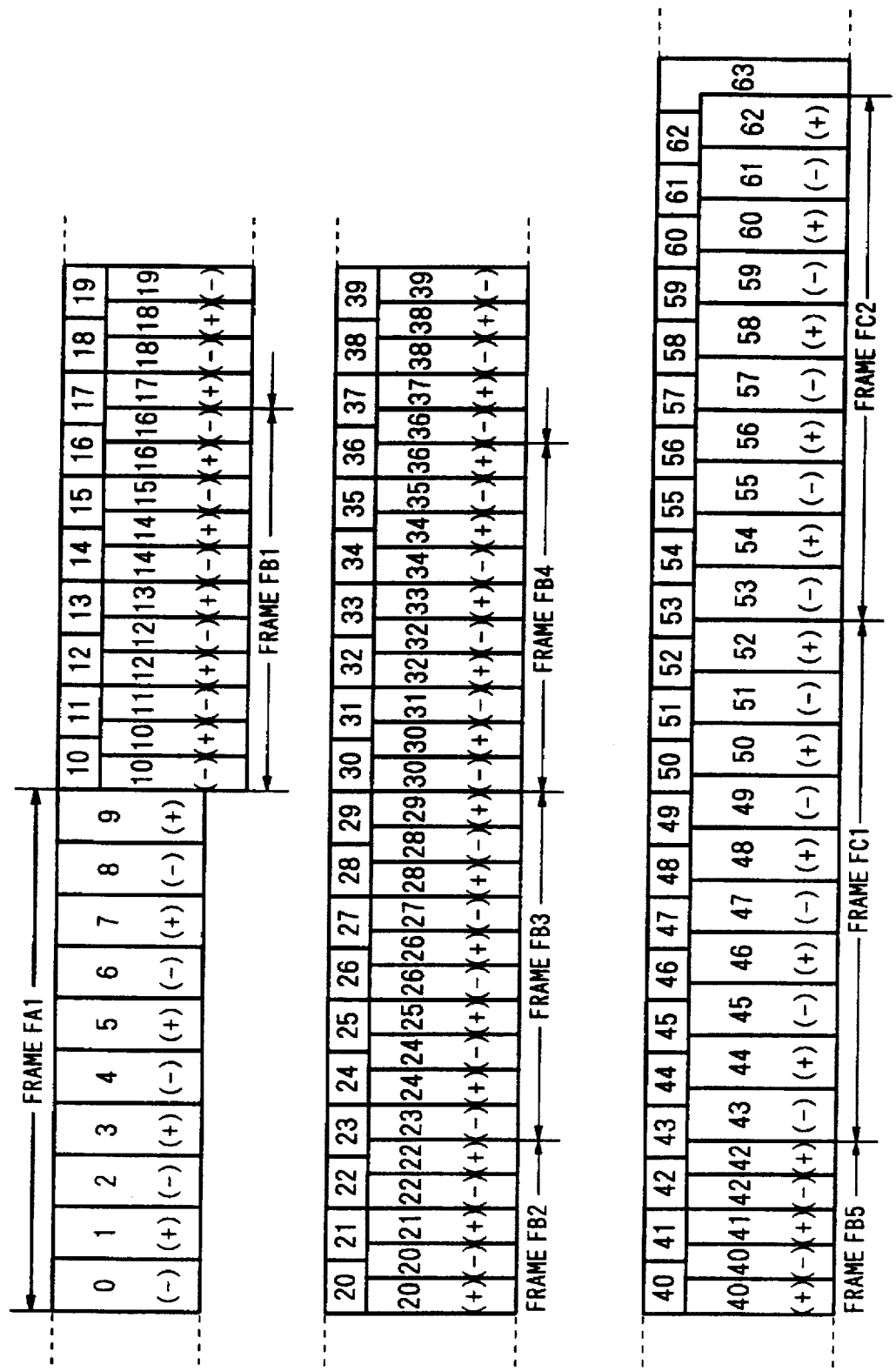
FIG. 19 is a schematic diagram which is used for explaining a case of recording track numbers in the NTSC system.

FIG. 19 shows a case where the recording of five frames (frames FB1 to FB5) is executed in the LP mode onto a tape on which tracks have been formed at the track pitch of 10 μm and a recording of two frames (frames FC1 and FC2) is executed in the SP mode.

In the example, a new recording in the LP mode is performed from the track of track number "10" and tracks are formed at a track pitch of 6.7 μm. In the portions of LP mode, the track numbers are recorded in a manner such that the even track numbers overlap twice like "10", "10", "11", "12", "12", "13", "14", "14", . . . . Since one frame is recorded in 10 tracks in the NTSC system, track numbers "10", "16", "23", "30", and "36" become the heads of the frames FB1, FB2, FB3, FB4, and FB5 newly recorded in the LP mode. A new recording is executed in the SP mode from a track number "43". In the SP mode, the track numbers are sequentially advanced one track by one like "43", "44", "45", . . . . Track numbers "43" and "53" become the heads of the frames FC1 and FC2 newly recorded in the SP mode.

As shown in FIG. 19, a track number at a position where the new recording is started, a track number at a position where the recording in the LP mode is switched to the recording in the SP mode, and a track number at a position where the new recording is finished are all continuous. Thus, the track number can be used as an index of the absolute address.

Since one frame is recorded in 10 tracks in the NTSC system, the head track numbers "10", "16", "23", "30", and "36" of the tracks are searched in the portions recorded in the LP mode. With respect to the track numbers "16" and "36" among those track numbers, however, the same track number exists at both of the end of the previous frame and the head of the subsequent frame. That is, the track number "16" exists at the end of the frame FB1 and the head of the frame FB2. The track number "36" exists at both of the end of the frame FB4 and the head of the frame FB5. Therefore, the heads of the frames cannot be searched only from the track numbers at positions corresponding to the track numbers "16" and "36". With respect to those portions, in addition to the track numbers, it is detected which azimuth angle the track has.

That is, as shown in FIG. 19, the head track of the frame is always set to be a track of (−) azimuth and, subsequently, (+) azimuth and (−) azimuth are alternately set so that the adjacent tracks have different azimuth angles. When the track numbers "16" and "36" are detected, therefore, the track of (−) azimuth is the head of the frame and the track of (+) azimuth is the end of the frame. When it is detected that the track numbers are "16" and "36" and the tracks have (−) azimuth, the heads of the frames at the positions of "16" and "36" can be detected.

The invention can be also similarly applied to the case of the PAL system. FIG. 20 shows track numbers added onto a tape by recording signals of the PAL system in the SP mode. In case of recording signals in the SP mode, as shown in FIG. 20, tracks are formed at a track pitch of 10 μm. The track number is sequentially advanced one track by one like "0", "1", "2", "3", . . . . Since one frame is recorded in 12 tracks in the PAL system, the track numbers "0", "12", "24", "36", . . . become the heads tracks of the frames FD1, FD2, FD3, . . . .

Figure 21:
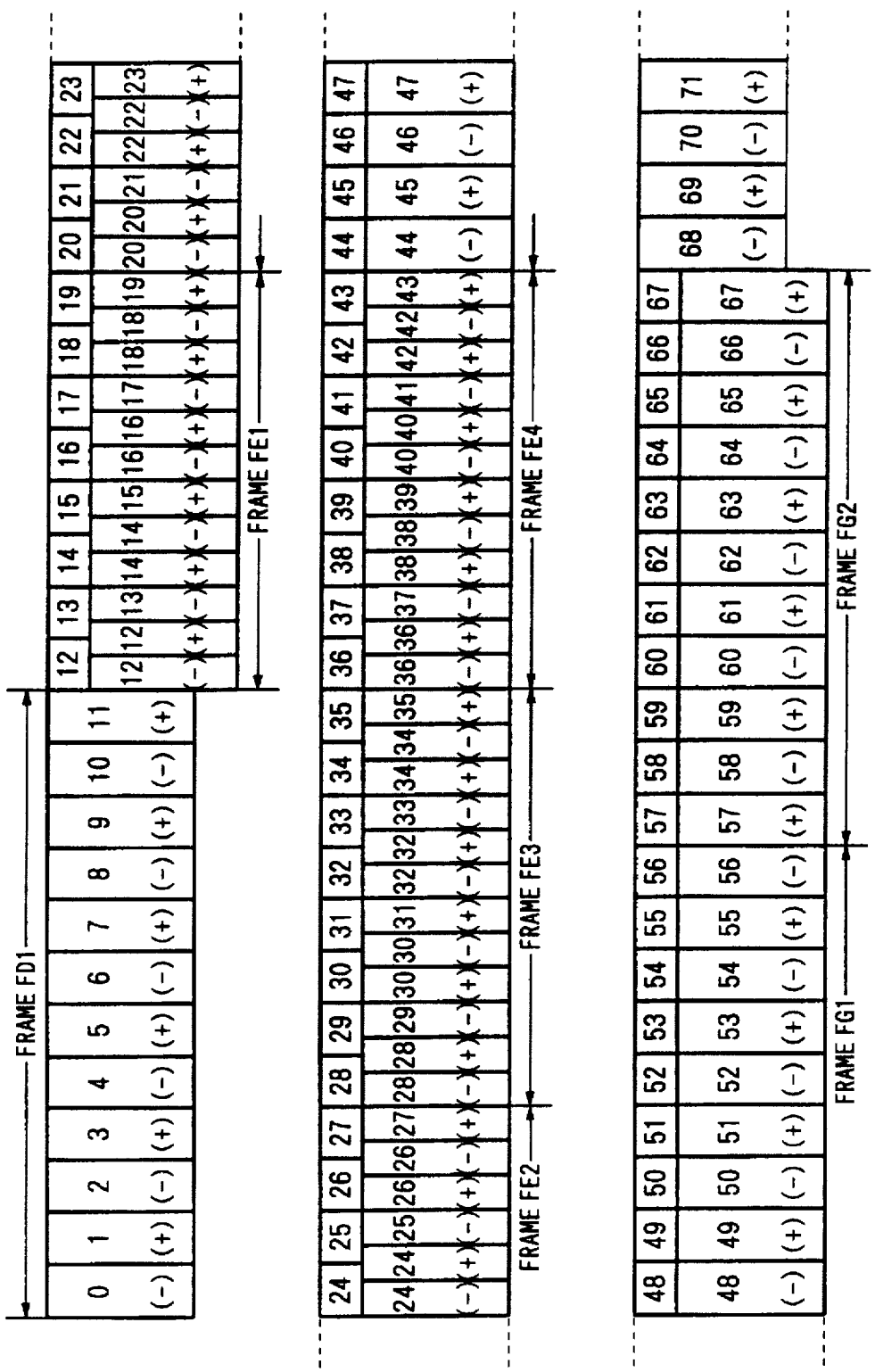
FIG. 21 is a schematic diagram which is used for explaining a case of recording track numbers in the PAL system.

FIG. 21 shows a case where a recording of four frames (frames FE1 to FE4) is performed in the LP mode on a tape on which tracks have been formed at the track pitch of 10 μm as mentioned above and a recording of two frames (frames FG1 and FG2) is subsequently performed in the SP mode.

In this example, a new recording in the LP mode is executed from the track of track number "12" and tracks are formed at a track pitch of 6.7 μm. The track numbers are recorded in a manner such that the even track numbers overlap twice like "12", "12", "13", "14", "14", "15", "16", "16", . . . in the portions in the LP mode. Since one frame is recorded in 12 tracks in the PAL system, track numbers "12", "20", "28", and "36" become the heads of the frames FE1, FE2, FE3, and FE4 which were newly recorded in the LP mode. A new recording is executed in the SP mode from the track number "44". The track number is sequentially advanced one track by one in the SP mode like "44", "45", "46", . . . . Track numbers "44" and "56" become the heads of the frames FG1 and FG2 newly recorded in the SP mode.

In the PAL system as well, the track number at the position where the new recording is started, the track number at the position where the recording is switched from the recording in the LP mode to the recording in the SP mode, and the track number at the position where the new recording is finished are all continuous. Thus, the track number can be used as an index of the absolute address.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A data recording and reproducing method comprising the steps of:

enabling a standard recording mode and a long time recording mode to be set in which a track pitch is narrower in said long time recording mode as compared said standard recording mode;

advancing a track number by one integer and recording the track numbers onto tracks in said standard recording mode;

advancing the track number of one of an odd number track or an even number track by one integer and utilizing such track number in two tracks, advancing the other of said odd number track and said even number track by one integer and utilizing the respective track number in only one track, and recording the track numbers onto said tracks in said long time recording mode; and detecting an absolute address on a tape on the basis of each of said track numbers reproduced.

2. A data recording and reproducing method according to claim 1, wherein a ratio of the track pitch in said standard recording mode to the track pitch in said long time recording mode is substantially equal to 3:2.

3. A data recording and reproducing method according to claim 1 wherein a signal of one frame is recorded in a plurality of tracks, azimuth angles of the head tracks of the frames are set to be equal, and the absolute address is detected on the basis of said track number reproduced and the azimuth angle of said reproduced track.

4. A magnetic recording and reproducing apparatus comprising:

means for setting a standard recording mode and a long time recording mode in which a track pitch is narrower in said long time recording mode as compared to said standard recording mode;

means for obtaining a track number by advancing a previous track number in a predetermined manner in accordance with whether the recording mode is said standard recording mode or said long time recording mode, in which in said standard recording mode the track number is advanced by one integer, and in said long time recording mode (i) the track number of one of an odd number track or an even number track is advanced by one integer and such track number is utilized in two tracks, and (ii) the track number of the other of said odd number track and said even number track is advanced by one integer and the respective track number is utilized in only one track; and means for recording said track numbers onto said track.

5. A magnetic recording and reproducing apparatus according to claim 4, wherein a ratio of the track pitch in said standard recording mode to the track pitch in said long time recording mode is substantially equal to 3:2.

6. A magnetic recording and reproducing apparatus according to claim 4, wherein a signal of one frame is recorded onto a plurality of tracks, azimuth angles of the head tracks of the frames are set to be equal, and an absolute address is detected on the basis of said track number reproduced and the azimuth angle of said reproduced track.

* * * * *